United States Patent
Barto et al.

(10) Patent No.: US 11,941,040 B1
(45) Date of Patent: Mar. 26, 2024

(54) COMPUTER-IMPLEMENTED SYSTEM AND METHOD TO CREATE A USER PROFILE USING MULTIMEDIA FILES

(71) Applicant: PICME TECHNOLOGY INC., San Francisco, CA (US)

(72) Inventors: Erick Barto, San Francisco, CA (US); Micheal Ihbe, San Francisco, CA (US); Brandon Durbin, San Francisco, CA (US)

( * ) Notice: Subject to any disclaimer, the term of this patent is extended or adjusted under 35 U.S.C. 154(b) by 0 days.

(21) Appl. No.: 17/901,181

(22) Filed: Sep. 1, 2022

(51) Int. Cl.
| | |
|---|---|
| G06F 16/40 | (2019.01) |
| G06F 8/61 | (2018.01) |
| G06F 16/41 | (2019.01) |
| G06F 16/435 | (2019.01) |
| G06F 16/45 | (2019.01) |
| G06F 8/60 | (2018.01) |

(52) U.S. Cl.
CPC .............. G06F 16/437 (2019.01); G06F 8/61 (2013.01); G06F 16/41 (2019.01); G06F 16/45 (2019.01)

(58) Field of Classification Search
CPC ......... G06F 16/437; G06F 16/41; G06F 16/45
See application file for complete search history.

(56) References Cited

U.S. PATENT DOCUMENTS

| | | | |
|---|---|---|---|
| 7,660,468 B2 | 2/2010 | Gokturk et al. | |
| 8,712,862 B2 | 4/2014 | Gokturk et al. | |
| 9,495,614 B1* | 11/2016 | Boman | G06F 16/29 |
| 9,753,948 B2 | 9/2017 | Lo | |
| 9,942,615 B1* | 4/2018 | Panchaksharaiah | G06F 16/48 |
| 10,994,210 B1 | 5/2021 | Barto | |
| 11,093,802 B2 | 8/2021 | Zmijewski et al. | |
| 2004/0128152 A1 | 7/2004 | Austin et al. | |
| 2005/0131762 A1 | 6/2005 | Bharat et al. | |
| 2008/0227549 A1 | 9/2008 | Itskov et al. | |
| 2010/0099471 A1 | 4/2010 | Feeney et al. | |
| 2012/0302337 A1 | 11/2012 | Thakkar et al. | |
| 2017/0228819 A1 | 8/2017 | Shenkar et al. | |
| 2019/0028533 A1* | 1/2019 | Rohatgi | H04L 67/06 |

* cited by examiner

*Primary Examiner* — Kristopher Andersen
(74) *Attorney, Agent, or Firm* — Nolan Heimann LLP; Adam Diament

(57) ABSTRACT

The present invention is a computer-implemented system and method for creating a user profile based on multimedia files. The method includes storing multimedia files associated with one or more users in at least one computing device. The method includes obtaining content data from the multimedia files stored in the computing device through a content extraction module. The content extraction module performs steps to obtain the content data from multimedia files. A mobile application accesses the files stored in the computing device. Files are extracted and processed by utilizing one or more machine learning algorithms and retrieving content data and file metadata for each multimedia file from the processed data. Content-based user attributes are created by analyzing the aggregated content data and file metadata, Content-based user attributes are transmitted to an application server and stores the content-based user attributes to a user profile database.

14 Claims, 4 Drawing Sheets

COMPUTER-IMPLEMENTED SYSTEM AND METHOD TO CREATE A USER PROFILE USING MULTIMEDIA FILES

CROSS-REFERENCE TO RELATED APPLICATIONS

None.

TECHNICAL FIELD

The present invention relates to user profile creation, in particular, to a computer-implemented system and method for creating a user profile based on multimedia files stored in the computing device of the user.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Currently, mobile devices automatically store information that is associated with the captured images and videos. Some individuals log their life so they can retrieve moments from past activities, for example, social events, trips, etc. Capturing and processing images and videos have significant benefits in various fields such as business, fitness and healthcare, and social research. Even though users can capture images with their mobile devices, mobile devices are not used to automatically infer users' interests and create a personal profile of the mobile device user. US Patent Application US20050131762A1 filed by Bharat, Krishna, et al. discloses a method for determining user profile information for a user, the method comprising: a) determining initial user profile information for the user; b) inferring user profile information for the user; and c) determining the user profile information for the user using both the initial user profile information and the inferred user profile information. According to them, initial user profile information can be determined from past online search queries, from past websites visited (referred as document selections), as well as quantitative or qualitative attributes concerning user background that have been manually captured by the user or inferred (i.e., Age=40; Annual Income=$50,000; US resident?=Yes), and may have an associated score related to the probability of the attribute value being correct. U.S. Pat. No. 10,994,210 to Barto, discloses a mobile game using image extraction, which is a system and method for providing an online game implemented by means of a computer system. The patent discloses a method for obtaining content data from a plurality of images stored in a computing device through a content extraction module.

However, the existing solutions are not effective to automatically determine those user attributes by retrieving content data and metadata from the images and videos stored on the mobile devices of the user. Further, additional functionality may be provided to assist advertisers in providing customized and personalized advertisements to the users, as well as other applications that can benefit from using a more robust user profile for new social mechanics, ID verification, provide data for insurance policy assessments, etc. Therefore, there is a need for systems and methods for automatically processing multimedia files and creating a user profile based on the processed multimedia files in a manner that provides useful and insightful information to advertisers and other applications that utilize user profile information.

BRIEF SUMMARY

The present invention mainly cures and solves the technical problems existing in the prior art. In response to these problems, the present invention provides a computer-implemented system and method to create a user profile based on a plurality of multimedia files owned by the user and stored in their personal device.

The present invention provides a computer-implemented method for creating a user profile based on multimedia files. The method includes the step of storing the multimedia files associated with one user in at least one computing device. The multimedia files include image files and video files. The method includes the step of obtaining content data from the multimedia files stored in the computing device through a content extraction module. The content extraction module performs a first plurality of steps to obtain the content data from the plurality of multimedia files. The first plurality of steps comprises installing a mobile application on the computing device and allowing the mobile application to access the multimedia files stored in the computing device; extracting the multimedia files from the computing device by the mobile application; processing the multimedia files by utilizing one or more machine learning models to obtain content data and retrieve file metadata for each multimedia file; aggregating the content data and file metadata; producing content-based user attributes by analyzing the aggregated content data and file metadata; transmitting the content-based user attributes to an application server; and storing the content-based user attributes to a user profile database.

In an aspect, the multimedia files and metadata are processed and classified based on a plurality of scenarios in which the multimedia files are captured.

In an aspect, the classification comprises filename, label and confidence, date, face identifier, smile confidence, speed, altitude, time, flash, and GPS coordinates.

In an aspect, the processed data and the metadata are aggregated and combined based on the information obtained by the machine learning algorithms.

In an aspect, the step of producing the plurality of content-based user attributes based on analyzing the content data further comprises: computing the totality of multimedia files associated to each label with a confidence level above a predetermined threshold; reporting each total label count; and adding to the content-based user attributes (e.g., 250 images or videos of "sushi").

In an aspect, the step of producing the plurality of content-based user attributes based on analyzing the content data further comprises: computing the multimedia files associated to each label over a discrete measure of time (t) comprising a day, week, month, and year; reporting each label count as a function of time; and adding to the content-based user attributes. (e.g.: Interest in dogs over time, 06/2022: 100 files, 07/2022: 100 files, 08/2022: 0 files. This attribute over time can be used to infer the user's dog passed away so dogs are no longer an interest for e-commerce applications or advertisements).

In an aspect, the step of producing the plurality of content-based user attributes based on analyzing the content data further comprises: obtaining a plurality of physical addresses by using reverse geocoding; analyzing the physical addresses to obtain geolocation attributes; and adding geolocation attributes to the content-based user attributes (e.g., Countries visited: 15, or International travel per annum: 3).

In an aspect, the step of producing the plurality of content-based user attributes based on analyzing the content data further comprises: calculating statistical values for a plurality of scalar attributes; and adding the statistical values for the scalar attributes to the content-based user attributes (e.g., Average Speed of pics in a car: 90 mph, could be used to infer unsafe driving in an insurance assessment).

In an aspect, the step of producing the plurality of content-based user attributes based on analyzing the content data further comprises: calculating a plurality of other valuable insights such as comparing two attributes (e.g., is the user more interested in "Dogs" or "Cats"; "Night Clubs" or "Hiking" can be used by other users to help infer a personality in a social mechanic), or comparing a group of attributes, by time and location (e.g., define when the user usually goes on vacation by selecting only files with GPS locations 40 mi or further away from their city of residence, establishing the user's favorite hobby or activity by comparing all activity labels such as hiking, surfing, cycling, etc.; then utilizing that information for e-commerce targeting before the next vacation period); and adding a plurality of other attributes to the content-based user attributes.

Accordingly, one advantage of the present invention is that it creates user profiles based on the image and video content stored in the computing device of the user. In an exemplary aspect, the images and videos stored on a phone can be used to understand the interest of a person.

Accordingly, one advantage of the present invention is that the multimedia files are processed using content-based image recognition algorithms as well as metadata extraction algorithms to infer personal traits associated with the user.

Accordingly, one advantage of the present invention is that the personal profile of the users is stored for use in a variety of applications e.g., the personal profile information could be used by the various advertising companies so that they can push customized advertisements to the users based on the personality traits and interests of the user; or used by a social media application to describe the user's interests to other users Other features of embodiments of the present invention will be apparent from the accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. The invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION OF THE EMBODIMENTS

Figure 1A:
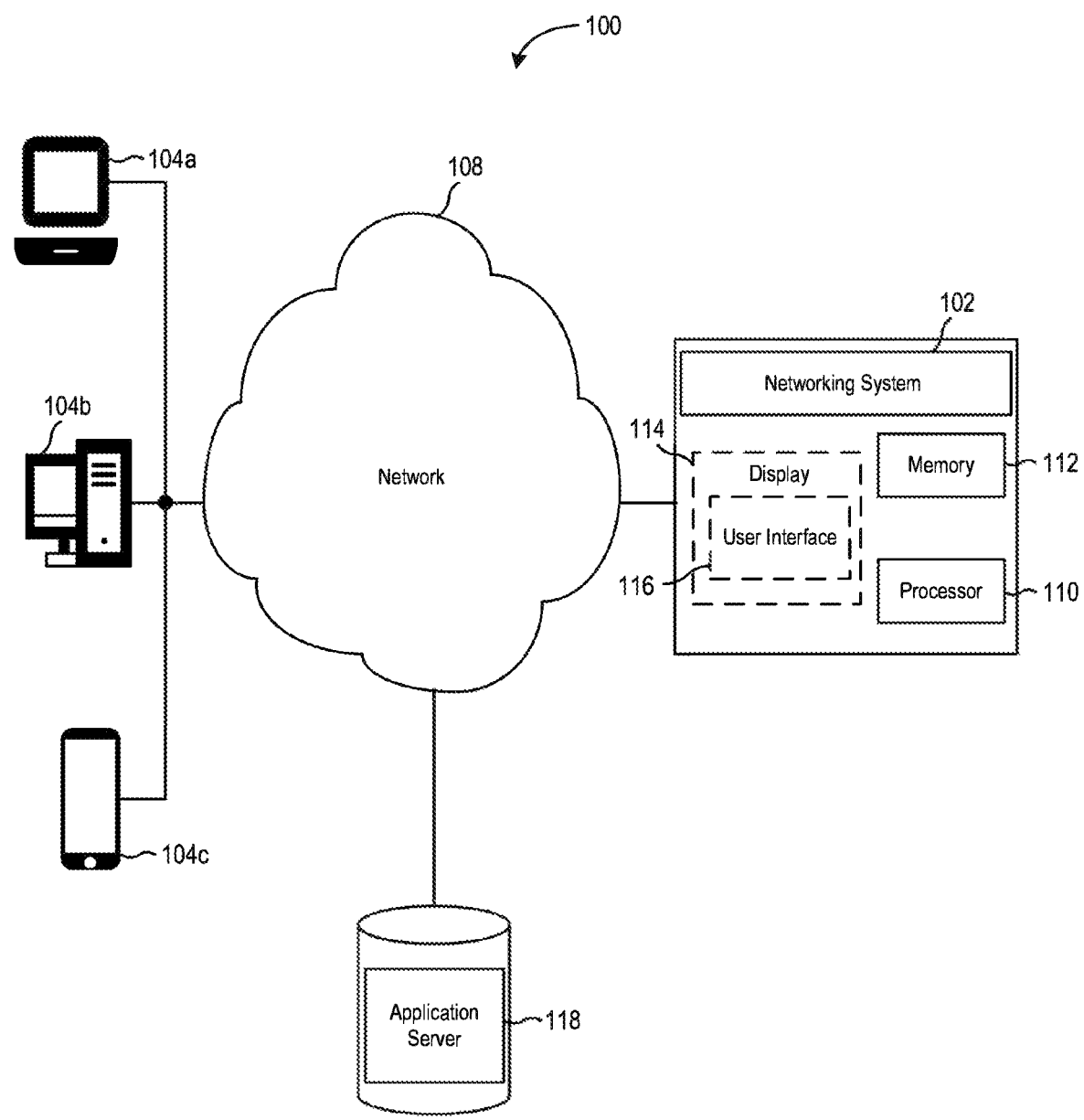
FIG. 1A illustrates a block diagram of the present computer implemented system to create a user profile based on a plurality of files, in accordance with one embodiment of the present invention.

The present invention is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Although the present invention has been described to disclose a system and method for the creation of a personal profile in which multimedia files owned by a user which may be stored in a computing device such as a mobile phone, the computer, or tablet, are processed using content-based image recognition algorithms as well as metadata extraction to infer personal traits associated to the user, it should be appreciated that the same has been done merely to illustrate the invention in an exemplary manner and to highlight any other purpose or function for which explained structures or configurations could be used and is covered within the scope of the present invention.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored, and that does not include carrier waves and/or transitory electronic signals propagating wirelessly or over wired connections. Examples of a non-transitory medium may include but are not limited to, a magnetic disk or tape, optical storage media such as compact disk (CD) or versatile digital disk (DVD), flash memory, memory, or memory devices.

FIG. 1A illustrates a block diagram 100 of the present computer-implemented system to create a user profile based on a plurality of multimedia files, in accordance with one embodiment of the present invention. The computer-implemented system includes at least one computing device 104a, 104b, and 104c, a networking system 102, a User Profile Database 118 that may be stored in a server, a processor 110, and a memory 112 communicatively coupled to the processor 110. The computing devices 104a, 104b, and 104c are associated with the users to store the multimedia files. The multimedia files comprise a plurality of image files and a plurality of video files. Examples of computing devices 104a 104b, 104c or user devices include but are not limited to a laptop 104a, a desktop 104b, and a smartphone 104c. Other examples of a plurality of computing devices 104, may include but are not limited to a phablet and a tablet. The networking system 102 is accessible by the users connected over network 108. Network 108 may be a wired or a wireless network, and the examples may include but are not limited to the Internet, Wireless Local Area Network (WLAN), Wi-Fi, Long Term Evolution (LTE), Worldwide Interoperability for Microwave Access (WiMAX), and General Packet Radio Service (GPRS).

The User Profile Database 118 includes user input data, content data, and file metadata pertaining to the multimedia files stored in the computing devices 104a, 104b, and 104c corresponding to each user. The User Profile Database 118 may be stored in a server farm or similar infrastructure (e.g. cloud) providing one or more hosted services to store User Profile Information.

In operation, when the user of a mobile phone 104c, creates a user profile, the mobile phone communicates the same with the networking system 102, via network 108. The processor 110 is communicatively coupled to a memory 112, which may be a non-volatile memory or a volatile memory. Examples of non-volatile memory may include, but are not limited to flash memory, a Read Only Memory (ROM), a programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

Processor 110 may include at least one data processor for executing program components for executing user- or system-generated requests. A user is a person using a device such as those included in this invention. Processor 110 may include specialized processing units such as integrated system (bus) controllers, memory management control units, floating point units, graphics processing units, digital signal processing units, etc.

Processor 110 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 110 may be implemented using a mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 110 may be disposed of in communication with one or more input/output (I/O) devices via an I/O interface. I/O interface may employ communication protocols/methods such as, without limitation, audio, analog, digital, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Memory 112 further includes various modules that store user owned multimedia files for user profile creation. These modules are explained in detail in conjunction with FIGS. 2A and 2B. The networking system 102 may further include a display 114 having a User Interface (UI) 116 that may be used by a user or an administrator to request or start the profile creation process. Display 114 may further be used to display various modules and actions pertaining to the profile creation. The functionality of the networking system 102 may alternatively be configured within each of the plurality of computing devices 104.

Figure 1B:
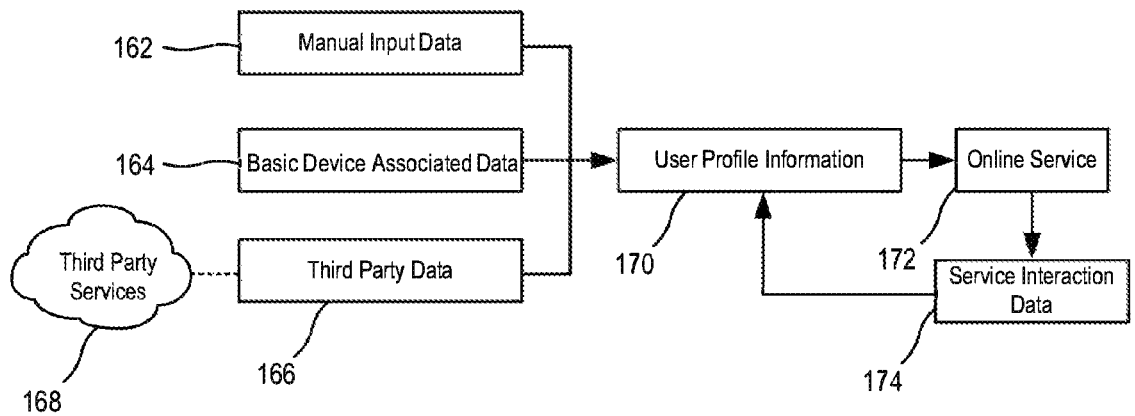
FIG. 1B illustrates a typical flowchart of a profile creation for a new service, in accordance with another embodiment of the present invention.

FIG. 1B illustrates a typical flowchart of a profile creation. FIG. 1B also depicts various sources of information that are used to populate the user profile information (UPI) 170. These sources of information include but are not limited to manual input data 162, basic device associated data 164, and third-party data 166 received from the third-party services 168. The UPI can be used for an online service 172 and then service interaction data 174 can also be obtained and added up to the UPI 170.

Figure 1C:
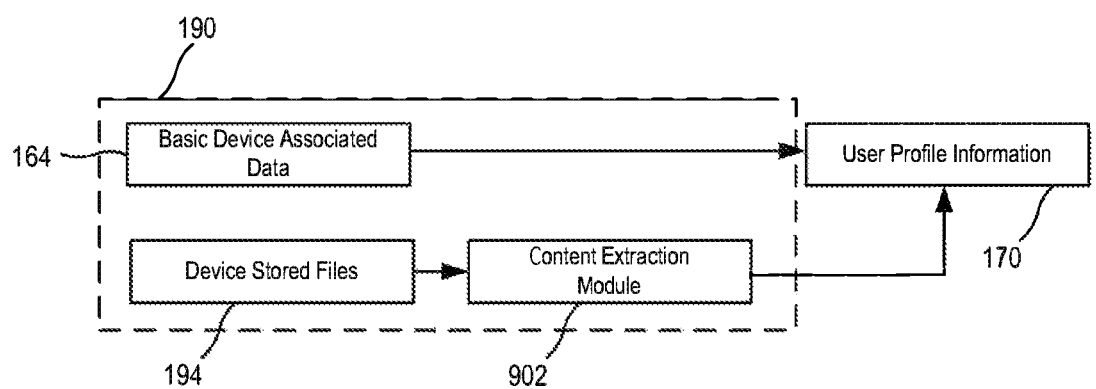
FIG. 1C illustrates a typical flowchart of two types of device data that may be obtained to create the user profile information (UPI), in accordance with another embodiment of the present invention.

FIG. 1C expands on FIG. 1B illustrates a typical flowchart 190 of two types of device data that may be obtained to create the user profile information (UPI) 170, in accordance with another embodiment of the present invention. The two types of device data include but are not limited to basic device associated data 164, and device stored files 194. The present invention performs machine learning (ML) processing, metadata extraction, and analysis to add to the UPI 170, which therefore causes the expansion of UPI not just from basic device associated data, but additional data from device stored files 194 that has been analyzed through the content extraction module 902 to base the UPI on an expanded set of data beyond what is jus typical of the basic device associated data 164.

Figure 2A:
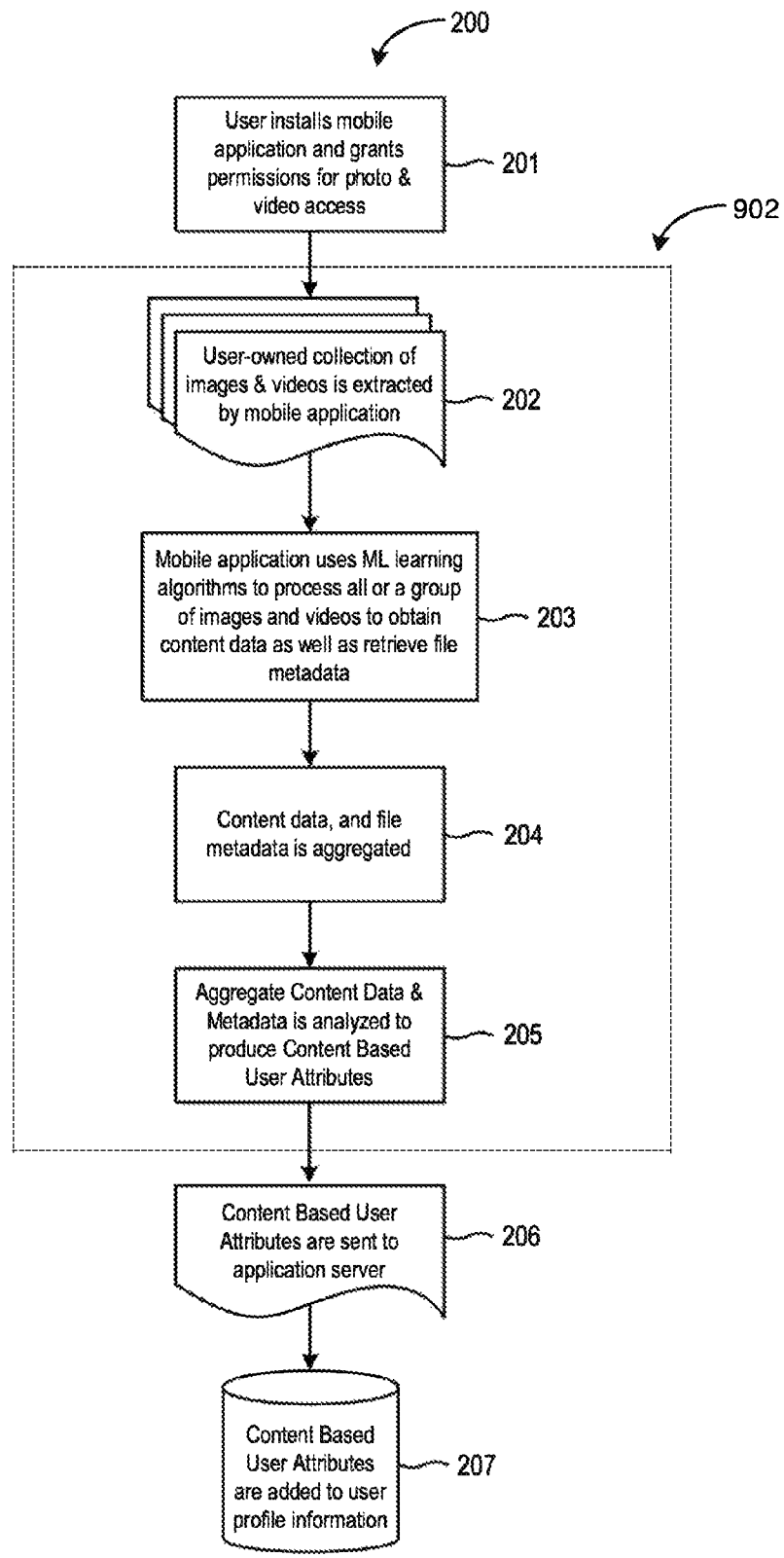
FIG. 2A illustrates a flowchart of a first plurality of steps performed by the content extraction module to obtain content data from the plurality of multimedia files stored in the computing device in yet another embodiment of the present invention.

FIG. 2A illustrates a flowchart 200 of a first plurality of steps performed by the content extraction module 902 to obtain content data from the plurality of multimedia files stored in the computing device in yet another embodiment of the present invention. FIG. 2A is explained in conjunction with FIG. 1C. The multimedia files associated with one or more users are stored in at least one computing device. The multimedia files include image files and video files. The content data is obtained from the multimedia files stored in the computing device through a content extraction module. The content extraction module performs a first plurality of steps to obtain the content data from the plurality of multimedia files. The content extraction module performs a step 201 of installing a mobile application on the computing device and allowing the mobile application to access the multimedia files stored in the computing device. The content extraction module performs a step 202 of extracting the multimedia files from the computing device by the mobile application. The content extraction module performs a step 203 of processing the multimedia files by utilizing one or more machine learning algorithms and retrieving content data and file metadata for each multimedia file from the processed data. In an embodiment, the machine learning algorithms may apply to content-based image recognition (CBIR) algorithms to search and extract multimedia files such as images from the computing device. Content-based image retrieval, also known as query by image content (QBIC) and content-based visual information retrieval (CB-VIR), is the application of computer vision techniques to the image retrieval problem. The content extraction module performs a step 204 of aggregating the content data and file metadata. The content extraction module performs a step 205 of producing content-based user attributes by analyzing the aggregated content data and the file metadata. The content data is analyzed to infer personality traits from the user. The content extraction module performs a step 206 of transmitting the content-based user attributes to an application server. The content extraction module performs a step 207 of storing the content-based user attributes in a user profile database. The personal profile of the users is stored for use in a variety of applications. The personal profile information could be commercialized to the various corporates or advertisers so that they can customize advertisements for the users. For example, the present invention may discover that a user is taking many pictures of dogs as time goes on, so advertisers may want to know that this user has increased interest in dogs, or based on photos may be an increased interest in traveling to certain locations, etc. Other content-based user attributes may not vary with time, but may just be a characteristic, like "animal-loving" "skydiving" "hiking" "outdoorsy" "watching sports," etc.

The following table depicts how the user profile information (UPI) is stored in the user profile database. According to an embodiment herein, the content-based user attributes may include information concerning users' interests, demographic information, traveling activities, age, gender, personal identifiable information, income, and other demographics which can be used by several services such as social networking, targeting advertisements, risk evaluations for insurance, personalization of content for shopping services, and any such other service that may benefit from the insights within the UPI attributes. A value is associated with a content-based user attribute may be qualitative (e.g., Name=Erick; Gender=Male) or quantitative (a discrete value i.e: Cat Interest=350 images, Maximum Speed=300 mph, Average Altitude=100 ft) or as an array of either quantitative or qualitative values such as Favorite cities=San Francisco, 100 visits; Mexico City 50, visits. The array of values could also be a function of time for example Dog interest=q(t) where t=time and is represented in week intervals while q is equal to the number of pictures of videos taken including a dog in any time interval, for example, the last 10 years which will provide a higher definition for any particular attribute.

| User Profile Information | | | | |
|---|---|---|---|---|
| Attribute 1 | Attribute 2 | Attribute 3 | . . . | Attribute n |
| Value Array A1 | Value Array A2 | Value Array A3 | . . . | Value Array An |

Figure 2B:
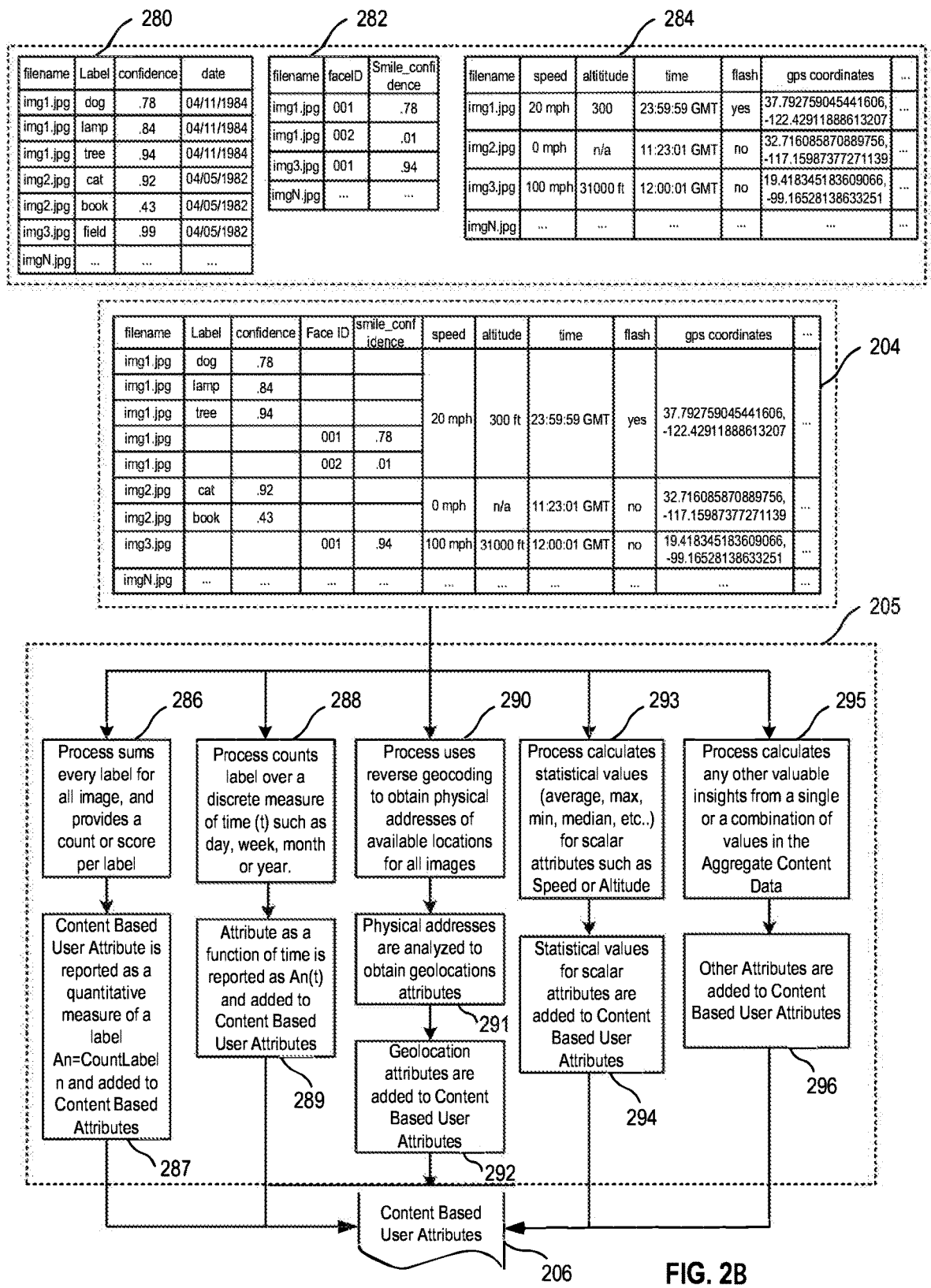
FIG. 2B illustrates a flowchart of specific steps performed by the content extraction module in conjunction with FIG. 2A, in accordance with another embodiment of the present invention.

FIG. 2B illustrates a flowchart of specific steps performed by the content extraction module 902 in conjunction with FIG. 2A, in accordance with another embodiment of the present invention. The image label table 280, the faceID table 282, and metadata table 284 are table representations of the arrays obtained from extracting multimedia content data from common machine learning models and metadata extraction. These examples of extracted multimedia data are a representation of step 203 in FIG. 2A. In an embodiment, the multimedia files and metadata are processed and classified based on a plurality of scenarios in which the multimedia files are captured. In an embodiment, the classification comprises filename, label, confidence, date, face ID, smile confidence, speed, altitude, time, flash, and GPS coordinates, and any other file specific attributes obtained. In an embodiment, the processed data and the metadata are aggregated and combined based on the scenarios classified by the machine learning algorithms. These examples of aggregating and combining multimedia data are a representation of step 204 in FIG. 2A.

In an embodiment, the step 205 of producing the plurality of content-based user attributes based on analyzing the content data further comprises a step 286 of adding every label for all the images and providing one or more of a count and score per label; and a step 287 of reporting content-based user attributes as a quantitative measure of the label; and adding to the content-based user attributes.

In an embodiment, the step 205 of producing the plurality of content-based user attributes based on analyzing the content data further comprises a step 288 of computing the labels over a discrete measure of time (t) comprising a day, week, month, and year; and a step 289 of reporting attribute as a function of time; and adding to the content-based user attributes.

In an embodiment, the step 205 of producing the plurality of content-based user attributes based on analyzing the content data further comprises a step 290 of obtaining a plurality of physical addresses by using reverse geocoding; a step 291 of analyzing the physical addresses to obtain geolocation attributes; and a step 292 of adding geolocation attributes to the content-based user attributes.

In an embodiment, the step 205 of producing the plurality of content-based user attributes based on analyzing the content data further comprises a step 293 of calculating statistical values (average, max, min, median, etc.) for a plurality of scalar attributes (such as speed or altitude); and a step 294 of adding the statistical values for the scalar attributes are added to the content-based user attributes. For example, 1) if the scalar attribute is speed, then the maximum speed for all the images/videos is calculated. 2) If the scalar attribute is altitude, then the maximum altitude for all images/videos is calculated. 3) If the scalar attribute is a time of day, then the average time of day for all images/videos during weekends is calculated. 4) If the scalar attribute is flash, then the sum of images/videos taken with a flash ON is calculated. 5) If the scalar attribute is camera type, the ratio of images/videos taken with the front camera vs the rear camera is calculated.

In an embodiment, the step 205 of producing the plurality of content-based user attributes based on analyzing the content data further comprises a step 295 of calculating a plurality of other valuable insights from a single or a combination of values in the aggregated content data; and a step 296 of adding a plurality of other attributes for the scalar attributes to the content-based user attributes.

Examples of the valuable insights include but are not limited to: 1) Quantifying a particular interest over time for instance "dogs". A person may have pics of dogs for several years, then zero pics of dogs over some time, and then again pics of dogs at least 1 per week. This could mean that the user's dog passed and then the user adopted another dog, providing meaningful insight for advertisements targeting dog food for example. 2) An example of a content-based user attribute that can be obtained from a combination of content data and file metadata is calculating the images that include alcohol, day of the week and time of day, and amount of people in the picture. This could provide insight into consumer habits such as does the person likes to drink socially during the weekend evenings or do they like to have a glass of wine with dinner during the week, which helps decide a character trait for a user. 3) Another example combining two or more values from the content data is "does this person like dogs more than cats," "do they like healthy food or fast food more," and "what is the user's favorite sport," can be answered by comparing all of the SUM values for each sport captured by the content data.

Then in step 206, the content-based user attributes are stored in the application server. The multimedia files such as captured photos and videos stored on a person's mobile device can be used to know and understand a lot about a person. For example, images of vacation photos, animals, and locations he/she has been to provide a lot of information and insights about the person by their photos. The present invention can also provide valuable insights about the person by how the photos and videos are changing over time. For example, the present invention can monitor if the person used to travel a lot to a certain location, but then stopped traveling there, or if the person used to take a lot of pictures of dogs, but now he/she doesn't. All of this information is used to create a profile of the person (which could be used for advertising and the like).

While embodiments of the present invention have been illustrated and described, it will be clear that the invention is not limited to these embodiments only. Numerous modifications, changes, variations, substitutions, and equivalents will be apparent to those skilled in the art, without departing from the scope of the invention, as described in the claims.

We claim:

1. A computer-implemented system to create a user profile based on a plurality of multimedia files, the computer-implemented system comprising:
   at least one computing device to store the multimedia files associated with one user, wherein the plurality of multimedia files comprising a plurality of image files, and a plurality of video files;
   a processor;
   a memory communicatively coupled to the processor, wherein the memory stores instructions executed by the processor, which, on execution, causes the processor to:
   obtain content data from the plurality of multimedia files stored in the computing device, wherein the processor of the at least one computing device performs a first plurality of steps to obtain the content data from the plurality of multimedia files, wherein the first plurality of steps comprising:
      installing, by the processor and the memory of the at least one computing device, a mobile application on the computing device and allowing the mobile application to access the multimedia files stored in the computing device;
      extracting, by the processor and memory of the at least one computing device, the multimedia files stored in the computing device by the mobile application;
      processing, by the processor and memory of the at least one computing device, the multimedia files by utilizing computer vision algorithms via data labeling, and retrieving a plurality of image label data as well as obtaining file metadata for each multimedia file stored in the device;
      aggregating, by the processor of the at least one computing device, the plurality of image label data, and file metadata to be referred to in aggregate as content data;
      producing, by the processor of the at least one computing device, a plurality of content-based user attributes by analyzing the aggregated plurality of image label data and the file metadata, wherein producing the plurality of content-based user attributes comprises:
         calculating a plurality of other valuable insights from a single or a combination of values in the aggregated content data;
         adding a plurality of other attributes for a plurality of scalar attributes to the plurality of content-based user attributes;
         inferring one or more personality traits associated with the user based on the plurality of other valuable insights inferred from the content data;
      transmitting, by the processor of the at least one computing device, the plurality of content-based user attributes to an application server; and
      storing, by the processor of the at least one computing device, the plurality of content-based user attributes to a user profile database;
   wherein the user profile is a collection of personality traits, preferred activities and information gained about the user based on advanced learning processing of the plurality of multimedia files having been captured by the user and stored in a personal computing device of the user.

2. The system according to claim 1, wherein the multimedia files and metadata are processed and classified based on a plurality of scenarios in which the multimedia files are captured, generating a classification, wherein the classification comprises at least one of a filename, a set of labels obtained through the computer vision algorithms along with a confidence level for each of the set of labels, and the file metadata including a date, a speed, an altitude, a time, a flash, and GPS coordinates.

3. The system according to claim 1, wherein the image label data and the file metadata are aggregated and combined to infer user profile insights or attributes.

4. The system according to claim 1, wherein the system produces the plurality of content-based user attributes by performing a plurality of steps comprising:
 adding a label for all of the plurality of images, and providing one or more of a count and score per the label;
 reporting the plurality of content-based user attributes as a quantitative measure of the label; and
 adding to the plurality of content-based user attributes.

5. The system according to claim 1, wherein the system produces the plurality of content-based user attributes by performing a plurality of steps comprising:
 computing a plurality of labels over a discrete measure of time (t) comprising a day, week, month, and year;
 reporting attribute as a function of time; and,
 adding to the content-based user attributes.

6. The system according to claim 1, wherein the system produces the plurality of content-based user attributes by performing a plurality of steps comprising:
 obtaining a plurality of physical addresses by using reverse geocoding;
 analyzing the physical addresses to obtain geolocation attributes; and,
 adding geolocation attributes to the content-based user attributes.

7. The system according to claim 1, wherein the system produces the plurality of content-based user attributes by performing a plurality of steps comprising:
 calculating statistical values for a plurality of scalar attributes; and,
 adding the statistical values for the plurality of scalar attributes are added to the content-based user attributes.

8. A computer-implemented method for creating a user profile based on a plurality of multimedia files, the computer-implemented comprising:
 storing, by one or more processors, the multimedia files associated with one or more users in at least one computing device, wherein the multimedia files comprising a plurality of image files, and a plurality of video files; and,
 obtaining, by the one or more processors, content data from the plurality of multimedia files stored in the computing device, wherein the one or more processors performs a first plurality of steps to obtain the content data from the plurality of multimedia files, wherein the first plurality of steps comprising:
 installing, by the one or more processors, a mobile application on the computing device and allowing the mobile application to access the multimedia files stored in the computing device;
 extracting, by the one or more processors, the multimedia files from the computing device by the mobile application;
 processing, by the one or more processors, the multimedia files by utilizing one or more machine learning algorithms and retrieving content data and file metadata for each multimedia file from the processed data;
 aggregating, by the one or more processors, the content data, and file metadata;
 producing, by the one or more processors, a plurality of content-based user attributes by analyzing the aggregated content data, and the file metadata, wherein producing the plurality of content-based user attributes comprises:
 calculating a plurality of other valuable insights from a single or a combination of values in the aggregated content data;
 adding a plurality of other attributes for a plurality of scalar attributes to the plurality of content-based user attributes;
 inferring one or more personality traits associated with the user based on the plurality of other valuable insights, content data, and file metadata; and
 providing customized advertisements to the user based on the plurality of other valuable insights, content data, and file metadata;
 transmitting, by the one or more processors, the plurality of content-based user attributes to an application server; and,
 storing, by the one or more processors, the plurality of content-based user attributes to a user profile database.

9. The computer-implemented method according to claim 8, wherein the multimedia files and metadata are processed and classified based on a plurality of scenarios in which the multimedia files are captured, generating a classification, wherein the classification comprising filename, label, confidence, date, face ID, smile confidence, speed, altitude, time, flash, and GPS coordinates.

10. The computer-implemented method according to claim 8, wherein the processed data and the metadata are aggregated and combined based on a plurality of scenarios classified by the machine learning algorithms.

11. The computer-implemented method according to claim 8, wherein the step of producing the plurality of content-based user attributes based on analyzing the content data further comprises:
 adding every label for all the images, and providing one or more of a count and score per label;
 reporting content-based user attribute as a quantitative measure of the label; and,
 adding to the content-based user attributes.

12. The computer-implemented method according to claim 8, wherein the step of producing the plurality of content-based user attributes based on analyzing the content data further comprises:
 computing a plurality of labels over a discrete measure of time (t) comprising a day, week, month, and year;
 reporting attribute as a function of time; and,
 adding to the plurality of content-based user attributes.

13. The computer-implemented method according to claim 8, wherein the step of producing the plurality of content-based user attributes based on analyzing the content data further comprises:
 obtaining a plurality of physical addresses by using reverse geocoding;
 analyzing the physical addresses to obtain geolocation attributes; and,
 adding geolocation attributes to the plurality of content-based user attributes.

14. The computer-implemented method according to claim 8, wherein the step of producing the plurality of content-based user attributes based on analyzing the content data further comprises:
 calculating statistical values for a plurality of scalar attributes; and, adding the statistical values for the plurality of scalar attributes are added to the plurality of content-based user attributes.

\* \* \* \* \*